O. C. WARRICK.
CULTIVATOR.
APPLICATION FILED NOV. 9, 1910.
1,011,295.
Patented Dec. 12, 1911.
3 SHEETS—SHEET 2.
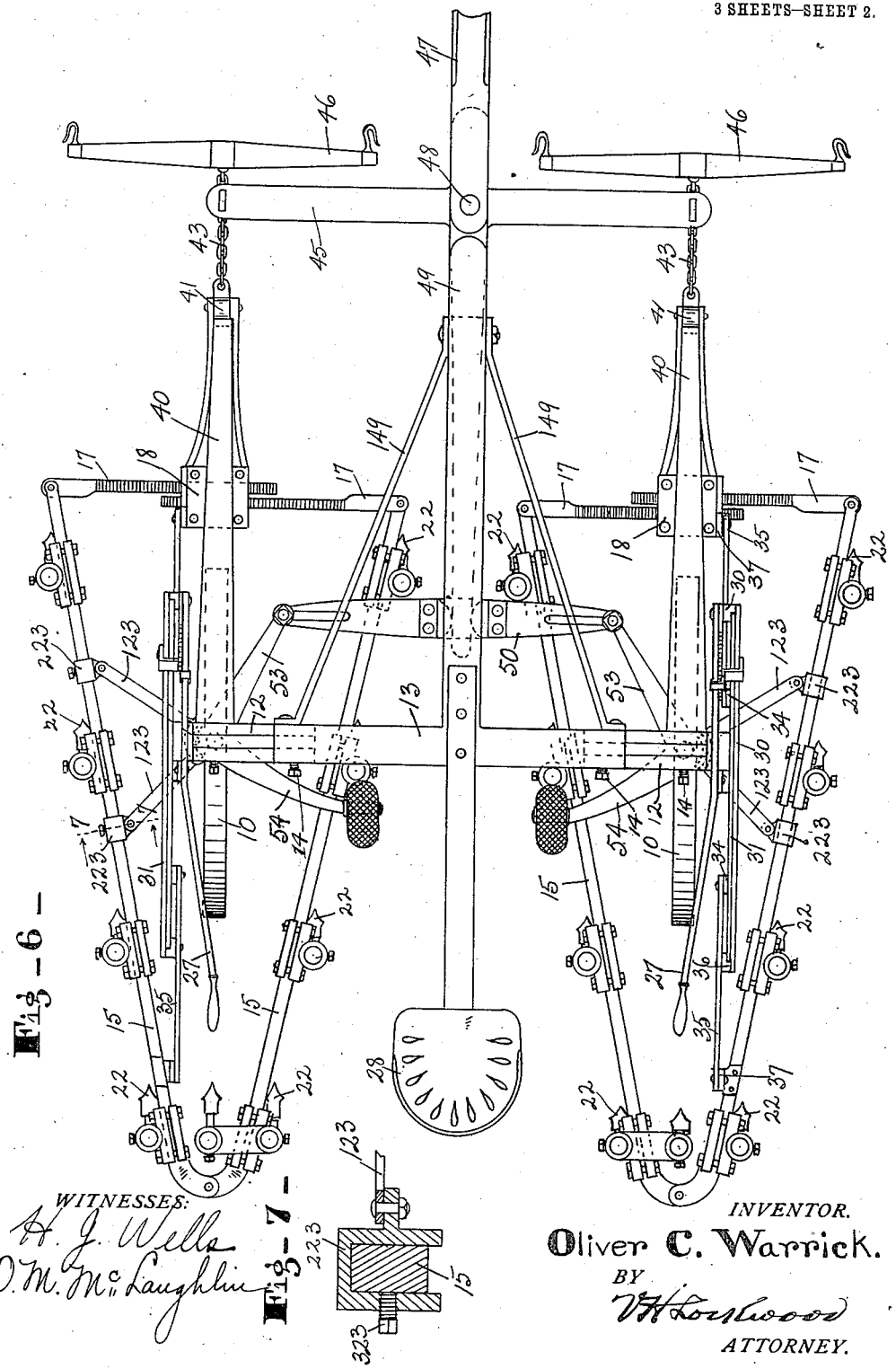
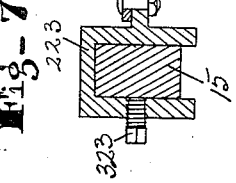
WITNESSES:
H. J. Wells
O. M. McLaughlin
INVENTOR.
Oliver C. Warrick.
BY
V. H. Lockwood
ATTORNEY.

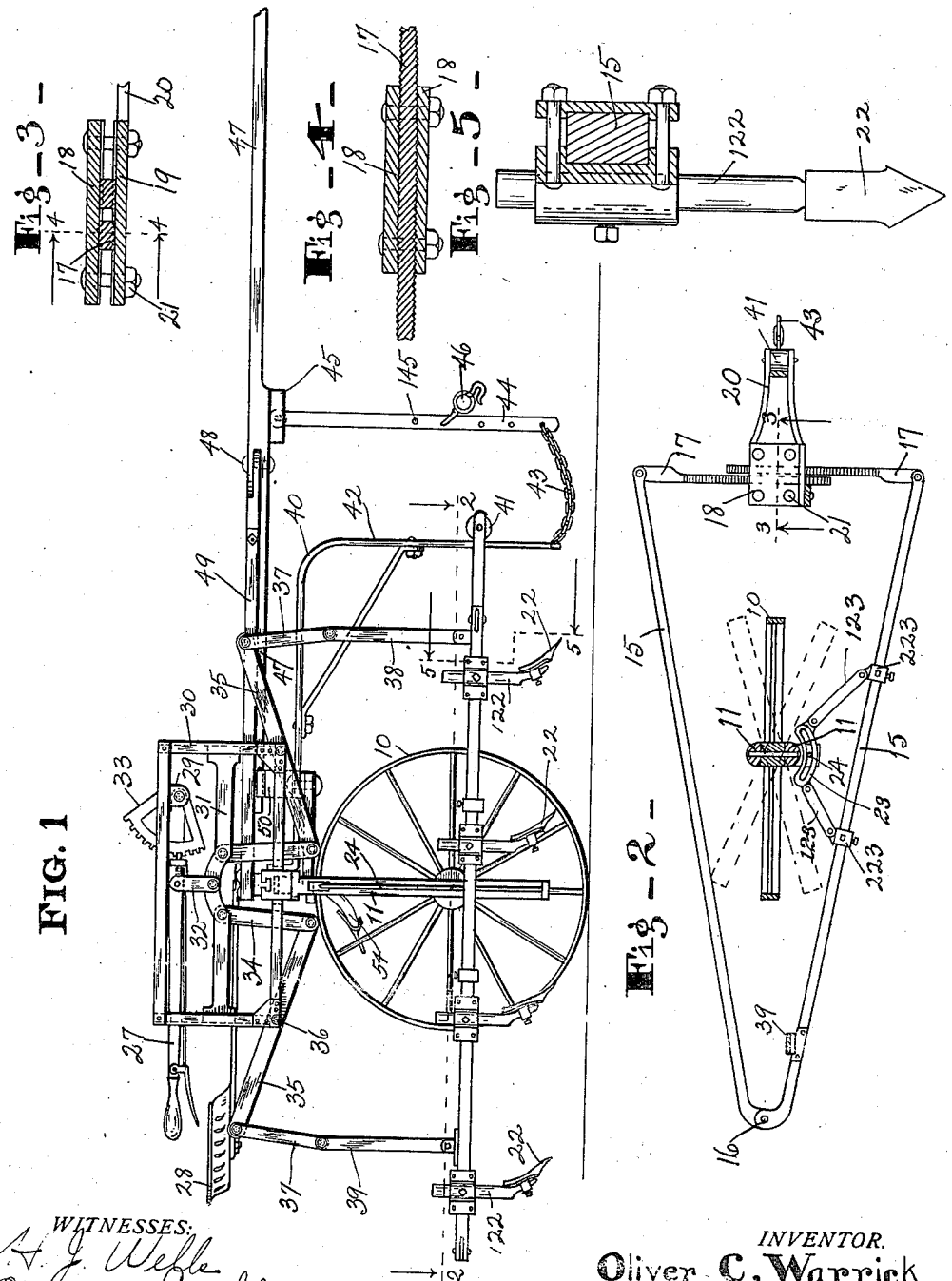

O. C. WARRICK.
CULTIVATOR.
APPLICATION FILED NOV. 9, 1910.

1,011,295.

Patented Dec. 12, 1911.
3 SHEETS—SHEET 3.

WITNESSES:

INVENTOR.
Oliver C. Warrick.
BY
ATTORNEY.

UNITED STATES PATENT OFFICE.

OLIVER C. WARRICK, OF PITTSBORO, INDIANA.

CULTIVATOR.

1,011,295. Specification of Letters Patent. Patented Dec. 12, 1911.

Application filed November 9, 1910. Serial No. 591,431.

*To all whom it may concern:*

Be it known that I, OLIVER C. WARRICK, of Pittsboro, county of Hendricks, and State of Indiana, have invented a certain useful Cultivator; and I do hereby declare that the following is a full, clear, and exact description thereof, reference being had to the accompanying drawings.

The object of this invention is to provide an improved construction of cultivators for cultivating corn or other plants which are in rows.

The chief feature consists in arranging the supporting or ground wheels within the gangs so that the wheels will run about half way between the rows and the cultivator will plow not only between the wheels but also on the outside of the wheels. In other words, the device plows all around the wheels and the wheels normally run at quite a distance from the corn rows so there is no danger of the corn being injured by the wheels, and along with the foregoing are the means for manipulating and regulating the location of the gangs relative to the wheels so the outside shovels may be accommodated to the two outer rows of corn. Hence the device may plow both sides of one row of corn and one side of two other rows.

Another feature of the invention consists in so mounting the transporting or ground wheels that at the ends of the rows and when the team begins to turn, the gangs may be continued straight on for a considerable distance thereafter so that they will plow up to the ends of the rows. To assist in accomplishing the foregoing object the tongue is fulcrumed at the forward end of the frame so that the tongue can turn obliquely more than the frame and the frame turn obliquely with reference to the wheels, as will hereafter appear.

Another feature of the invention consists in hitching the horses to a frame extended from the axle rather than the tongue, and the gang frame coöperates with said hitching frame so that the pull of the horse will be largely on the gang frame.

Another feature of the invention consists in mounting the two sets of supporting wheels and gangs adjustable with relation to each other so that the width of the machine may be adjusted and the machine be used for plowing either one or two rows at a time.

The nature of the invention will be understood from the accompanying drawings and the following description and claims.

In the drawings, Figure 1 is a side elevation of the cultivator with the forward end of the tongue broken away and the gang frames elevated. Fig. 2 is a horizontal section on the line 2—2 of Fig. 1 showing one of the gang frames in plan view and also showing altered positions of the ground wheels by dotted lines. Fig. 3 is a section on the line 3—3 of Fig. 2. Fig. 4 is a section on the line 4—4 of Fig. 3. Fig. 5 is a section on the line 5—5 of Fig. 1 showing one shovel and associated parts in front elevation. Fig. 6 is a plan view of the machine with the tongue partly broken away. Fig. 7 is a section on the line 7—7 of Fig. 6. Fig. 8 is a rear elevation of the machine, widened positions being indicated by dotted lines. Fig. 9 is a plan view of the machine in position while turning. Fig. 10 is a section on the line 10—10 of Fig. 9, the ground wheels being partially broken away. Fig. 11 is a section on the line 11—11 of Fig. 9. Fig. 12 is a section on the line 12—12 of Fig. 11. Fig. 13 is a section on the line 13—13 of Fig. 12. Fig. 14 is a section on the line 14—14 of Fig. 13.

In detail, there are two independently mounted supporting or ground wheels 10 each mounted in a downwardly extending fork 11 pivoted at its upper end in a block 12 so as to be horizontally oscillatable. The head of the fork has a peripheral groove 111 into which a screw 112 loosely projects. The block 12 is mounted in connection with a transverse frame bar 13 so as to be transversely adjustable with relation thereto. This connection is effected by a dove-tail construction, as indicated in Fig. 10. In this manner the adjustable blocks 12 at each end of the frame bar 13 may be set close enough together to enable the device to plow only one row of corn, or spread apart far enough to plow two rows, and when in adjusted position said blocks 12 are held in place by set screws 14 in the frame bar 13.

Each wheel 10 is within or surrounded by the triangular gang frame 15, which tapers rearwardly, and the two side bars of said frame at their rear ends are pivoted together at 16, while the two forward ends of the gang frame bars have inwardly extending transverse bars 17 pivoted thereto, the inner ends of said bars being slidable between an upper clamping plate 18 and a lower clamping plate 19, from which latter plate the beam frame 20 extends. The inner surfaces of the plates 18 and 19 are serrated, and likewise the surfaces of the transverse bar 17 is serrated, and the upper clamping plate is clamped on said bars and to the lower clamping plate by bolts 21, so that the transverse bars can thus be effectually clamped at any adjusted position, and thereby the width of the gang frame increased or diminished according to the work desired or the width of the rows.

The gang frames have shanks 122 extending downwardly therefrom with shovels 22 in their lower ends. A cam plate 23 with a cam slot in it which is concentric with a vertical line through the center of the connection of the fork 11 with the block 12 and through which extends a guide rod 24 secured to the outside of the fork. The cam plate 23 is pivoted to two bars 123 adjustably secured to the gang frame by a U-shaped clamp 223 and set screw 323. This holds the gang in proper position when the ground wheel 10 is oscillated horizontally one way or the other, and, in fact, thereby the gang is held in proper position with the ground wheels all the time.

With this construction the gang frame is vertically adjustable, and the guide rod 24 guides the gang frame in its vertical movement. The vertical movement thereof is caused by a hand-lever 27 at the upper part of the machine in proximity to the seat 28, which is secured to the cross frame bar 13 at a suitable elevation to enable the machine to be conveniently operated. The hand-lever 27 is fulcrumed to the bracket 29, which is secured to the upper part of the frame 30, which is a rectangular frame secured at its lower part to the block 12 so as to be rigid with said block. The end bars of said frame 30 are provided with vertical grooves in their inner surfaces and constitute, therefore, vertical guides for the vertically movable bars 31, which are centrally connected with the levers 30 by the connecting bars 32. Hence, when the lever 27 is elevated, the bar 31 will also be elevated, and the lever 27 is held in its elevated position by a segment bar 33 secured to the frame 30. The sliding bars 31 are connected by two pivotal bars 34 with levers 35 pivoted about midway of their ends at 36 to the lower corners of the frame 30. The forward lever 35 at its outer end is pivoted to a connecting bar 37 which extends down and is pivoted to the upper end of a bar 38, which is rigidly secured to the frame 20. The rear lever 35 is pivoted by a connecting bar 37 to a bar 39, which is rigidly fastened to one of the side bars of the gang frame 15. Therefore, the gang frame is lifted out of the ground and at a considerable elevation therefrom, when desired, or dropped down to the ground for plowing, as will become necessary in the operation of the cultivator. The depth of the plowing can be regulated by the position of the hand-lever 27 in the segment bar 33.

A bar 40 is rigidly secured at its rear end to the block 12 and projects forwardly to a point above the forward end of the gang frame and then downwardly through cut-out portions of the frame 20, which constitutes the forward portion of the gang frame just to the rear of a roller 41 secured to said frame. The bar 40 is at its lower end made stronger by a brace 42, so as to make the same rigid, for the pull of the horse is on the lower end of said bar 40. Thus, a chain 43 extends from the lower end of the bar 40 to the lower end of a hitch bar 44, which is pivoted at its upper end to a cross bar 45 in the nature of a doubletree, although the swingletrees 46 are not fastened to the bar 45. They are fastened to the bar 44 at the desired elevation, and for that purpose the bar is provided with holes 145 in which the trees may be hooked. Hence, a portion of the pull of the horse is transmitted to the tongue 47, to which the cross bar or doubletree bar 45 is secured, but the major portion of the pull of the horse comes on the lower end of the bar 40 and is transmitted therefrom to the beam frame 20 of the gang frame. Hence, the major portion of the pull of the horse is on the forward end of each gang frame. Some of the pull on the bar 40 is also transmitted to the block 12 and frame 13 and to the wheel forks and ground wheels so as to cause the movement of the cultivator. The pull of the horse which goes to the tongue also is transmitted to the frame, which is carried by the wheels, and, therefore, to the wheels. Hence, the pull of the horse is distributed substantially in proportion to the necessities of the operation of the cultivator and so as to make it nearly as direct as possible. It is desirable that there be a straight, forward pull on the gangs for they should run level.

The tongue 47 is pivoted between its ends by a pin 48 to the forward portion of an A-shaped frame consisting of the transverse frame bar 13, forward bar 49 and braces 149, which are rigidly secured to the transverse bar 13 and extend forwardly therefrom. The bar 13 and frame 49 together constitute what may be called the frame of the machine. The tongue has a portion extending rearwardly of its pivot 48 and under the frame 49. This rear portion of the tongue may be integral with the forward portion or rigidly secured thereto. The tongue, however, must be coupled with the frame 49 so that they together will be maintained in a horizontal position, but the tongue may turn laterally and horizontally in either direction relative to the frame 49 when the team reaches the end of the rows of corn and is being turned. The rear end of the tongue extends almost to the transverse bar 13 of the frame and at its rear end projects through a bracket 150 on a cross bar 50 about midway. The cross bar 50 is slotted at each end and is pivoted at its ends to the forward ends of two arms 53, which are rigidly secured at their rear ends to the ground wheel forks 11. The pivots 153 pass through the slots. Pedal bars 54 extend from the upper part of the forks 11 inwardly toward each other in position to receive the feet of the workman in the seat 28. With these pedal bars the workman is enabled to guide the wheels of his plow while plowing so as to accommodate the implement to crooked rows, or sloping ground, or passing about obstacles and turning at the ends of the rows. When the wheels are turned relative to the frame of the machine, the tongue is correspondingly oscillated but in an opposite direction, so that the two parts, the wheels and the tongue, coöperate in turning for any purpose. The chief advantage, however, of the means for guiding the cultivator, which has just been explained, is in turning at the ends of the rows and enabling the cultivator to plow out close to the ends of the rows while the team is turning. In operating this cultivator at the ends of the rows, the team is driven as close to the fence as possible and then turned, and as it turns the tongue and thereby the frame of the machine, the workman, through the pedal bars, turns the wheels in an opposite direction so the gangs will move on parallel with the rows of corn just as they had been running before the ends of the rows were reached, and he continues to do this and to further operate the pedal bars until he has reached the limit of the oscillatory movement of the forks in which the wheels are mounted, and then with the wheels set at an angle with reference to the tongue, the cultivator will run around the ends of the rows; whereas with the old type of cultivator, the wheels and plowing part of the device could not follow the team but would cut across the ends of the rows and break down the corn. The workman lifts his gangs as the wheels run out about the ends of the rows. The workman can also guide his wheels as he chooses in the field according to the requirements of the work, and can widen or narrow his cultivator as desired, or lift one gang and let the other work. This gives unusual control of the various parts of the cultivator and permits the various parts to be independently adjustable with regard to each other, and also the pull of the team is well distributed to the different parts of the cultivator.

I claim as my invention:

1. A cultivator including a main frame, a pair of gang frames, a ground wheel mounted in connection with the main frame and within each gang frame, a hand lever on the main frame for each gang frame, a vertically movable sliding frame actuated by each of said hand levers, a lever in front of said main frame and in pivotal connection therewith between its ends, a pivotal connection between the forward end of said lever and gang frame, a lever behind said main frame and in pivotal connection with said first-mentioned lever, and a pivotal connection between the rear end of said last-mentioned lever and gang frame.

2. A cultivator including a main frame, ground wheels, forks carried by said ground wheels and connected with the main frame so as to be horizontally oscillatable, a gang surrounding each wheel, means mounted in connection with the main frame for elevating and lowering the gang frame, a guide rod 24 secured to the outside of each fork, and means secured to the gang frame for engaging and being guided by said guide rod.

3. A cultivator including a main frame, ground wheels, forks carried by said ground wheels and connected with the main frame so as to be horizontally oscillatable, a gang surrounding each wheel, means mounted in connection with the main frame for elevating and lowering the gang frame, a guide rod 24 secured to the outside of each fork, and a plate secured to the outer bar of each gang provided with a curved slot through which said guide rod extends.

4. A cultivator including a main frame, a tongue connected therewith, ground wheels mounted in connection with said main frame, a gang frame, means mounted in connection with the main frame for supporting the gang frame, and a bar secured to the main frame at each side and extending forwardly and then downwardly loosely through the forward portion of the gang frame and means connecting the lower end of said bar with said tongue, whereby the draft of the team will be on the cross bar connected with the double-tree, said forwardly projecting bar from the main frame and the forward ends of the gang frames.

5. A cultivator including a main frame, a tongue connected therewith, ground wheels mounted in connection with said main frame, a gang frame, means mounted in connection with the main frame for supporting the gang frame, a bar secured to the main frame at each side and extending forwardly and then downwardly loosely through the forward portion of the gang frame, means connecting the lower end of said bar with said tongue, and a roller mounted in the forward part of each gang frame behind and against which said bar extends, whereby said bar will not interfere with the vertical adjustment of the gang frame and will always transmit draft to the gang frame.

6. A cultivator including a transverse frame, a pair of blocks mounted in connection with the end portions of said frame and transversely adjustable thereon toward and away from each other, ground wheels mounted in connection with said blocks, and a gang in connection with each of said blocks, whereby the distance between the wheels and gangs at each side of the cultivator may be pre-determined.

7. A cultivator including a transverse frame, a pair of blocks mounted in connection with the end portions of said frame and transversely adjustable thereon toward and away from each other, ground wheels mounted in connection with said blocks, and a gang in connection with each of said blocks each of said gangs being formed of side bars pivotally connected at their rear ends, and laterally adjustable means for connecting said bars at the forward ends, whereby the width of each gang and also the distance between the wheels and gangs on the two sides of the cultivator may be predetermined.

8. A cultivator including a main frame, ground wheels, a fork astride and carried by each ground wheel which is mounted in connection with the main frame so as to be horizontally oscillatable, a pedal bar extending inwardly from each fork in position to be operated by the feet of the operator, an arm extending forwardly from each fork, and a cross bar pivotally connected with the forward ends of said arms.

9. A cultivator including a main frame, ground wheels, a fork astride and carried by each ground wheel which is mounted in connection with the main frame so as to be horizontally oscillatable, a pedal bar extending inwardly from each fork in position to be operated by the feet of the operator, an arm extending forwardly from each fork, a cross bar pivotally connected with the forward ends of said arms, a tongue pivotally mounted between its ends to the forward end of the main frame, whereby the tongue will be horizontally oscillatable with relation to the main frame, and a connection between the rear end of said tongue and said cross bar, whereby the tongue and the wheels will be oscillated in opposite directions.

In witness whereof, I have hereunto affixed my signature in the presence of the witnesses herein named.

OLIVER C. WARRICK.

Witnesses:
G. H. BOINK,
J. H. WELLS.

---

Copies of this patent may be obtained for five cents each, by addressing the "Commissioner of Patents Washington, D. C."